J. H. STANFIELD.
CUTTING DEVICE.
APPLICATION FILED JULY 24, 1916.

1,211,777.

Patented Jan. 9, 1917.

Inventor
Jasper H. Stanfield

Witness
D. B. Bradford

By Cyrus W. Rice
his Attorney

United States Patent Office.

JASPER H. STANFIELD, OF MUSKEGON, MICHIGAN, ASSIGNOR OF ONE-HALF TO FRANK C. PANGBORN, OF GRAND RAPIDS, MICHIGAN.

CUTTING DEVICE.

1,211,777.

Specification of Letters Patent.

Patented Jan. 9, 1917.

Application filed July 24, 1916. Serial No. 110,874.

*To all whom it may concern:*

Be it known that I, JASPER H. STANFIELD, a citizen of the United States, residing at Muskegon, in the county of Muskegon and State of Michigan, have invented new and useful Improvements in Cutting Devices, of which the following is a specification.

The present invention relates to devices for cutting linoleum, paper board, and the like; and its object is generally to provide an improved device of that character; and more particularly, to provide a guide rule for such devices which shall be readily held against lateral or slipping movement on the work or material being cut; and further, to provide improved guided members for the cutter carriage; and further, to provide for such carriage improved means for detachably securing a cutter blade thereto. This, and any other objects appearing hereinafter, are attained by, and the invention finds preferable embodiment in, the structure hereinafter described and illustrated by the accompanying drawings, in which:—

Figure 1:
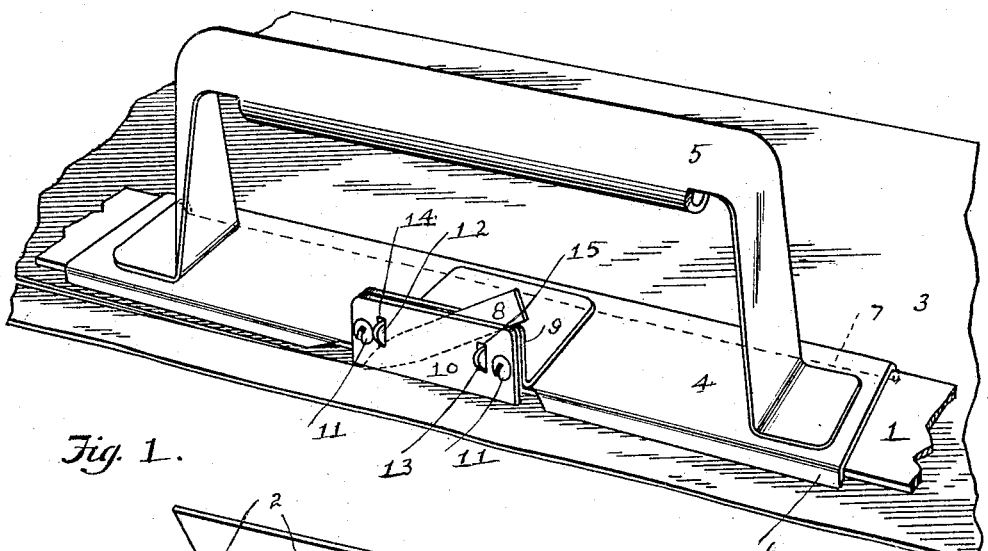
Figure 2:
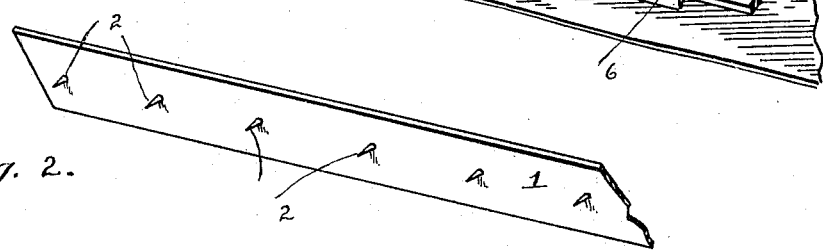
Figure 3:
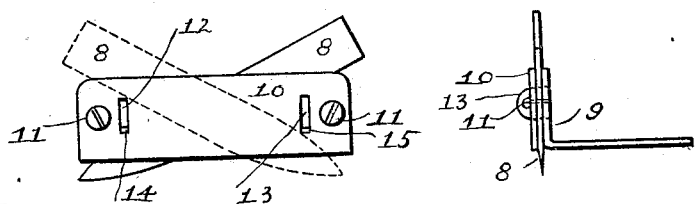
Figure 4:
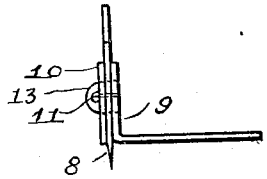
Figure 5:
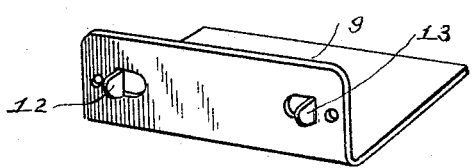

Figure 1 is a view in perspective of my device; Fig. 2 is a like view of the guide rule showing its under side and the spurs carried thereon; Fig. 3 is a side view of the clamp for holding the cutter blade; Fig. 4 is an end view of the same; and Fig. 5 is a view in perspective of the fixed member of said clamp.

A guide rule 1 is held against slipping or lateral movement by spurs 2 extending downwardly into the work or material to be cut, as the linoleum, or paper board 3. The holes formed by these spurs may be utilized to insert nails or tacks when the material is being fastened in the desired position later.

A carriage 4 provided with a suitable handle 5 is adapted to be slidably guided along the rule, as by the downwardly-extending members 6, 7 which closely and guidedly embrace the opposite edges of the rule. An extended and very accurate guide for the carriage along the rule is thus provided, permitting the ready application of the carriage to and its removal from the rule transversely thereto.

A cutter blade 8 whose cutting edge and point extend below the carriage and rule, is mounted on the carriage and severs the material in a line parallel with the rule as the carriage is slid along. This cutter blade is removably held by a clamp, one of whose members 9 is fixed on the carriage and the coöperating member 10 is adjustably held relatively to the fixed member by screws 11 which, when tightened, securely clamp the cutter blade between said members.

A pair of lugs or projections 12, 13 extend between the members, being carried by one and extending into orifices 14, 15 in the other member. When the cutter blade is clamped between the clamp members, one of its edges is above one lug and resting thereon, and its other edge is below and resting on the other lug, whereby the cutter blade is securely held against movement from its proper inclined position shown in the views.

It will be seen that the cutter blade may be held in the position shown in solid lines in Fig. 3, or in the opposite position shown in dotted lines in said view; so that the carriage may be cuttingly moved in one direction when such blade is held in one such position, and in the opposite direction when the blade is held in the other position.

The invention being intended to be defined solely by the claims, is not to be limited to or by details of construction shown or described.

I claim:

1. In a device of the character described; a carriage; a clamp mounted on the carriage and comprising a pair of members with a pair of lugs extending between them; and a cutter blade adapted to be clamped between the members with one of its edges above one lug and its other edge below the other lug.

2. In a device of the character described; a carriage; a clamp comprising one member fixed on the carriage and a coöperating member adjustably held relatively to the first member by screws; the clamp having a pair of lugs extending between said members; and a cutter blade adapted to be clamped by the screws between the members, with one of its edges above one lug and its other edge below the other lug.

3. In a device of the character described; a carriage; a clamp comprising one member fixed on the carriage and a coöperating member adjustably held relatively to the first member by screws; one of said members having a pair of lugs, and the other member having orifices into which said lugs extend; and a cutter blade adapted to be clamped by the screws between the members, with one of its edges above one lug and its other edge below the other lug.

In testimony whereof I have hereunto set my hand in presence of two subscribing witnesses, at Grand Rapids, Michigan, this 20th day of July, 1916.

JASPER H. STANFIELD.

Witnesses:
CYRUS W. RICE,
F. C. PANGBORN.

Copies of this patent may be obtained for five cents each, by addressing the "Commissioner of Patents, Washington, D. C."